United States Patent [19]

Cuscurida

[11] 4,293,470
[45] Oct. 6, 1981

[54] STABILIZING POLYUREA POLYMER POLYOLS BY TREATING WITH A SECONDARY AMINE

[75] Inventor: Michael Cuscurida, Austin, Tex.

[73] Assignee: Texaco Inc., White Plains, N.Y.

[21] Appl. No.: 168,898

[22] Filed: Jul. 11, 1980

[51] Int. Cl.$^3$ .............................................. C08G 18/32
[52] U.S. Cl. ..................... 260/45.9 R; 260/415.9 QA; 528/49; 528/85; 560/25; 560/26; 560/115; 560/158
[58] Field of Search ...................... 528/49, 85; 560/25, 560/26, 115, 158; 260/45.9 R, 45.9 QA

[56] References Cited

U.S. PATENT DOCUMENTS

| | | | |
|---|---|---|---|
| 3,325,421 | 6/1967 | Muller | 260/33.4 U |
| 4,002,584 | 1/1977 | Takahashi et al. | 528/49 |
| 4,009,307 | 2/1977 | Erikson et al. | 528/49 |
| 4,107,102 | 8/1978 | Dahm et al. | 521/51 |

*Primary Examiner*—Maurice J. Welsh
*Attorney, Agent, or Firm*—Carl G. Ries; Robert A. Kulason; Kenneth R. Priem

[57] ABSTRACT

A polyurea polymer polyol with improved storage stability is made by the reaction of a hydroxyl-containing amine, a polyether polyol of about 3,000 to 8,000 molecular weight and an organic polyisocyanate followed by quenching with a secondary amine. This stable polyurea polymer polyol may be used in the manufacture of flexible polyurethane foams which are firmer and stronger than similar products using conventional polyols.

17 Claims, No Drawings

STABILIZING POLYUREA POLYMER POLYOLS BY TREATING WITH A SECONDARY AMINE

BACKGROUND OF THE INVENTION

1. Field of the Invention

This invention pertains to the field of polyurethane plastics.

2. Description of the Prior Art

The use of a polyol in the preparation of polyurethanes by reaction of the polyol with a polyisocyanate in the presence of a catalyst and perhaps other ingredients is well known. Conventional polyols for flexible polyurethane foams are usually made by the reaction of a polyhydric alcohol with an alkylene oxide, usually ethylene oxide and/or propylene oxide, to a molecular weight of about 2000 to 3000 and above. These polyols are then reacted with polyisocyanate in the presence of water or other blowing agents such as fluorocarbons to obtain polyurethane foams. The prior art describes modified polyols containing polymerized vinyl monomers such as styrene or acrylonitrile or other materials such as hydrazine hydrate adducts have been included to improve the properties of the resulting foam. However, some of these prior art materials are highly toxic and require in addition, stripping of unreacted vinyl monomers or water of hydration. U.S. Pat. No. 4,107,102 describes the manufacture of polyurethane foam using a polyol containing hydrazine and its adducts.

German Offenlegungsschrift No. 2,110,055 discloses a process for making a polyurethane product whereby a hydroxyl-containing amine is included in the formulation in a one-shot process. That is, the hydroxyl-containing amine is simply included initially with the polyol and the polyisocyanate and a polyurethane product results. The German process does not use a polyurea polymer polyol which is then reacted with a polyisocyanate. My invention makes improved polyurethane foams over the process of the German patent as will be made clear by the disclosure and the examples which follow.

U.S. Pat. No. 3,325,421 discloses the method of making a stable dispersion of a urea in a composition comprising a diamine, an organic polyisocyanate and a compound having at least two alcoholic hydroxyl groups.

Co-pending application Ser. No. 86,365 filed Oct. 17, 1979, now abandoned, wherein I am a co-inventor disclosed polyurea polymer polyols as disclosed herein without the improved storage stability.

SUMMARY OF THE INVENTION

The invention is a method for producing a polyurea polymer polyol with improved storage stability by reacting a hydroxyl-containing amine, a polyether polyol and an organic polyisocyanate and then quenching the reaction product with a secondary amine. The invention is also the resulting composition and a method for making a foam from the stabilized polyol.

DESCRIPTION OF THE PREFERRED EMBODIMENTS

The polyurea polymer polyol without the improvement embodied herein is made by the reaction of a hydroxyl-containing amine, a polyether polyol and an organic polyisocyanate as disclosed in co-pending application Ser. No. 86,365 filed Oct. 17, 1979, now abandoned. The hydroxyl-containing amine should range in molecular range from about 60 to about 200 and preferably from about 60 to about 150 and is exemplified by the following typical compounds: monoethanolamine, diethanolamine, 2-(2-aminoethoxyethanol), hydroxyethylpiperazine, N-methylethanolamine and 2-hydroxyethylethylenediamine and 1-amino-1-propanol.

The polyether polyol which is used has a hydroxyl number preferably between about 20 and 60. The polyol is generally an alkylene oxide adduct of a polyhydric alcohol with a functionality of from about 2 to about 4. The alkylene oxide may suitably be ethylene oxide, propylene oxide, or 1,2-butylene oxide or a mixture of some or all of these. The polyol will preferably have a molecular weight within the range of from about 2,000 to about 8,000 and more preferably, from about 3,000 to about 8,000. The alkylene oxide is preferably propylene oxide or a mixture of propylene oxide and ethylene oxide.

The polyisocyanate used herein may be any aromatic or aliphatic polyisocyanate. Typical aromatic polyisocyanates include m-phenylene diisocyanate, p-phenylene diisocyanate, polymethylene polyphenyl polyisocyanates, 2,4-toluene diisocyanate, 2,6-tolulene diisocyanate, dianisidine diisocyanate, ditolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate and mixtures thereof.

Greatly preferred aromatic polyisocyanates used in the practice of the invention are 2,4- and 2,6-toluene diisocyanates and methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

To the polyurea polymer polyol prepared from the above ingredients a secondary amine is added in amounts ranging from about 0.1–1.0 wt. %. A preferred class of secondary amines is represented by the following formula:

where R is $C_1$ to $C_8$ alkyl. Particularly preferred secondary amines are those where R is $C_4$ to $C_8$. Also, preferred is morpholine. The amount of quenching amine to be used is not critical but from about 0.0 to 2.0 weight % preferably about 0.1 to 1.0 weight percent based on the weight of reactants is useful. Other amounts may be used if put under conditions as circumstance warrants.

The polyurea polymer polyol with improved storage stability prepared from the above ingredients is then incorporated into a formulation which results in a polyurethane product. The polyurea polymer polyol may be used in conjunction with a polyisocyanate such as those mentioned above or may be combined with additional polyol such as those mentioned above and reacted with a polyisocyanate to form a resulting polyurethane foam product.

In order to form the polyurethane foam, a catalyst useful in preparing foams of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N'N'-tetramethyl-1,3-butanediamine, N,N-dimethylpiperazine, 1,4-diazabicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as Ti(OR)$_4$', Sn(OR)$_4$', Al(OR)$_3$', and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi, and metal carbonyls of iron and cobalt.

Of course combinations of any of the above polyurethane catalysts may be employed. Usually the amount of catalyst employed ranges from about 0.01 to about 5.0 parts by weight percent based on 100 parts by weight of the polyol. More often the amount of catalyst used is 0.2 to 2.0 parts by weight.

Foaming is carried out in the presence of water and, optionally, additional organic blowing agents. The water is normally used in amounts of 0.5 to 15 parts by weight, preferably, 1.0 to 10 parts by weight based on 100 parts by weight of the polyurea polymer polyol and any additional polyol present. The organic blowing agents optionally used along with the water are known in the art and are, for example, monofluorotrichloromethane, difluorodichloromethane, methylene dichloride and others generally known in the art.

Additives to regulate the cell size and the cell structure, for example, silicone oil such as silicone-glycol copolymers and dimethylpolysiloxanes may also be added to the foaming mixture. Fillers, flame retarding additives, dyes or plasticizers of known types may also be used. These and other additives are well known to those skilled in the art.

The invention and its improvement over the art will now be illustrated with the aid of the following examples. These examples are intended to illustrate the invention but are not intended to delineate the expected scope of the invention.

EXAMPLE I

Into a two-liter three-necked flask equipped with a thermometer, stirrer, dropping funnel, water condenser and nitrogen source was charged 950 g THANOL®SF-5505 (32-36 hydroxyl no. ethylene oxide-capped glycerin-based polyol; Jefferson Chemical Co.), and 18.5 g (0.285 eq.) hydroxyethylpiperazine. Toluene diisocyanate (31.5 g, 0.362 eq.) was then added dropwise over a fifteen minute period. The temperature of the reaction mixture rose from 22°–33° C. during this period. After a two-hour digestion period, the reaction was quenched with 9.95 g dibutylamine. The resultant product was a white, opaque viscous liquid which had the following properties:

| | |
|---|---|
| Hydroxy no., mg KOH/g | 35.9 |
| Water, wt. % | 0.05 |
| pH in 10:6 isopropanol-water | 9.0 |
| Total amine, meq/g | 0.145 |
| Viscosity, | |
| 77° F., cps (days) | 2180 (1) |
| | 4100 (14) |
| | 5100 (39) |
| | 5660 (77) |
| | 5000 (104) |
| | 4000 (139) |
| Appearance | Homogenous throughout storage. |

EXAMPLE II

This example will illustrate the preparation of polyurea polymer polyols by reaction of hydroxyethylpiperazine and toluene diisocyanate in the presence of THANOL®SF-5505 polyol. It will further show the improved storage stability of dibutylamine-quenched products as compared to those prepared in its absence.

Into a ten-gallon kettle were charged 38 lb. THANOL SF-5505 and 0.96 lb. hydroxyethylpiperazine. The reactor was then evacuated and purged with prepurified nitrogen. Toluene diisocyanate (1.04 lb.) was then added through a bottom feed line over a twenty minute period. The reaction temperature peaked at 35° C. After a three hour digestion period, the reaction was quenched with 45.4 g dibutylamine. The product was a white, opaque viscous liquid with the following properties. For comparison, properties of a product prepared without using dibutylamine quenching agent are included.

| Run Number | A | B |
|---|---|---|
| Charge | | |
| THANOL SF-5505, lb. | 38 | 38 |
| Hydroxyethylpiperazine, lb. | 0.96 | 0.96 |
| Toluene diisocyanate, lb. | 1.04 | 0.04 |
| Dibutylamine, g. | 45.4 | — |
| Properties | | |
| Hydroxy no., mg KOH/g | 43 | 36.3 |
| Water, wt % | 0.05 | 0.04 |
| pH in 10:6 isopropanol-water | 11.4 | 9.8 |
| Viscosity, 77° F., cps, (days) | 2500 (7) | 4060 (1) |
| | 2500 (49) | 3940 (37) |
| | 2300 (61) | 4760 (169) |
| | 2300 (112) | |

EXAMPLE III

This example will illustrate the preparation of a polyurea polymer polyol by reaction of 1-amino-2-propanol and toluene diisocyanate in the presence of THANOL®SF-6503 polyol (26–28 hydroxyl no. ethylene oxide-capped glycerin-based polyol; Jefferson Chemical Co.). It will further show the improved storage stability of a dibutylamine-stabilized product as compared to material made in its absence.

Into a ten gallon kettle were charged 38 lb. THANOL SF-6503 and 0.7 lb. 1-amino-2-propanol. The reactor was then evacuated and purged with prepurified nitrogen. Toluene diisocyanate (1.3 lb.) was then added through a bottom feed line over a thirty minute period. The reaction mixture was then digested two hours. The reaction temperature peaked at 33° C. during the digestion period. After digestion, 20 lb. product was drained from the reactor. To the remaining material in the kettle (20 lb.) was added 22.7 g dibutylamine. The products were white, opaque viscous liquids which had the following properties:

| Run No. | A | B |
|---|---|---|
| Dibutylamine added | no | yes |
| Properties | | |
| Hydroxy no., meq KOH/g | 36.4 | 35.3 |
| Water, wt % | 0.05 | 0.04 |
| pH in 10:6 isopropanol-water | 6.4 | 6.5 |
| Viscosity, 77° F., cps (days) | 4800 (1) | 4900 (1) |
| | 10700 (7) | 8750 (7) |
| | 20800 (41) | 12700 (41) |

EXAMPLE IV

This example will illustrate the effectiveness of the dibutylamine stabilized polyols of this invention in the preparation of HR foam. It will further show that although foam can be prepared from nonstabilized products the foaming mixture was of higher viscosity. This might result in poor flowability in a molding operation. Formulations and details of preparation are given in the following table.

| Foam No. | A | B | C | D |
|---|---|---|---|---|
| Formulation, pbw | | | | |
| THANOL SF-6503-HEP-TDI polyurea polymer polyol | — | — | 40[c] | 40[d] |
| THANOL SF-5505-HEP-TDI polyurea polymer polyol | 40[a] | 40[b] | — | — |
| THANOL SF-5505 | 60 | 60 | 60 | 60 |
| Water | 3.8 | 3.8 | 3.8 | 3.8 |
| Q2-5043 silicone | 2.0 | 2.0 | 2.0 | 2.0 |
| THANCAT TD-33 | 0.25 | 0.25 | 0.25 | 0.25 |
| THANCAT DM-70 | 0.25 | 0.25 | 0.25 | 0.25 |
| NIA®A-1 | 0.25 | 0.25 | 0.25 | 0.25 |
| Dibutyltin dilaurate | 0.013 | 0.013 | 0.013 | 0.013 |
| 80/20 TDI/PAPI | 47 | 46.9 | 46.5 | 46.6 |
| NCO/OH | 1.02 | 1.02 | 1.02 | 1.02 |
| Details of preparation | | | | |
| Cream time, sec. | 7 | 7 | 7 | 7 |
| Rise time, sec. | .05 | 110 | 110 | 110 |
| Gel time, sec. | 210 | 240 | 240 | 225 |
| Foam appearance | good foam, fine cells | good foam, fine cells | good foam, fine cells | good foam, foaming mixture did not flow well because of high viscosity |

[a] stabilized with 0.25% dibutylamine; hydroxy no., mg KOH/g 42.2 viscosity, 77° F. (87 days), cps 2330
[b] not stabilized, hydroxyl no., mg KOH/g 40.4, viscosity, 77° F. (87 days), cps 2880
[c] stabilized with 0.25% dibutylamine, hydroxyl no., mg KOH/g 35.3 viscosity, 77° F. (129 days) cps 10680
[d] not stabilized, hydroxyl no., mg OH/g 36.4, viscosity, 77° F. (129 days) cps 17900

I claim:

1. A polyurea polymer polyol made by reacting a hydroxyl-containing amine, a polyether polyol of about 3000 to 8000 molecular weight and an organic polyisocyanate wherein the amount of polyisocyanate reacted is less than the stoichiometric amount needed to satisfy the hydroxyl group of the hydroxyl-containing amine and the polyether polyol and adding to the reaction product an amount of secondary amine effective to improve the storage stability of said polyurea polymer polyol.

2. A polyol as in claim 1 wherein the hydroxyl-containing amine is monoethanolamine.

3. A polyol as in claim 1 wherein the hydroxyl-containing amine is diethanolamine.

4. A polyol as in claim 1 wherein the hydroxyl-containing amine is 2-(2-aminoethoxyethanol).

5. A polyol as in claim 1 wherein the hydroxyl-containing amine is hydroxyethylpiperazine.

6. A polyol as in claim 1 wherein the hydroxyl-containing amine is 1-amino-2-propanol.

7. A polyol as in claim 1 wherein the secondary amine added is has the formula

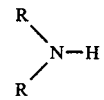

where R is $C_1$ to $C_8$ alkyl.

8. A polyol as in claim 7 wherein the amine added is dibutylamine.

9. A polyol as in claim 1 wherein the amine added is morpholine.

10. In a method for producing a polyurea polymer polyol having improved storage stability wherein there is reacted a mixture of a hydroxyl-containing amine, a polyether polyol of about 3000 to 8000 molecular weight and an organic polyisocyanate wherein the amount of polyisocyanate reacted is less than the stoichiometric amount needed to satisfy the hydroxyl groups of the hydroxyl-containing amine and the polyether polyol the improvement which comprises adding to the reaction product an amount of secondary amine effective to improve the storage stability of said polyurea polymer polyol.

11. A method as in claim 10 wherein the hydroxyl-containing amine is monoethanolamine.

12. A method as in claim 10 wherein the hydroxyl-containing amine is diethanolamine.

13. A method as in claim 10 wherein the hydroxyl-containing amine is 2-(2-aminoethoxyethanol).

14. A method as in claim 10 wherein the hydroxyl-containing amine is hydroxyethylpiperazine.

15. A method as in claim 10 wherein the hydroxyl-containing amine is 1-amino-2-propanol.

16. A method as in claim 10 wherein the secondary amine added is has the formula

where R is $C_1$ to $C_8$ alkyl.

17. A polyurea polymer polyol made by reacting a hydroxyl containing amine, a polyether polyol of about 3000 to 8000 molecular weight and an organic polyisocyanate wherein the amount of polyisocyanate reacted is less than the stoichiometric amount needed to satisfy the hydroxyl group of the hydroxyl-containing amine and the polyether polyol and adding to the reaction product an amount of a secondary amine of the formula

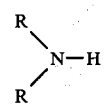

where R is $C_1$ to $C_8$ alkyl effective to improve the storage stability of said polyol.

* * * * *